(12) United States Patent
Tada et al.

(10) Patent No.: US 7,607,234 B2
(45) Date of Patent: Oct. 27, 2009

(54) POSITIVE LOAD ALIGNMENT MECHANISM

(75) Inventors: Makoto Tada, Hatogaya (JP); Chi-Pin Chou, Taichung (TW); Li-Shua Sun, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 91 days.

(21) Appl. No.: 11/850,676

(22) Filed: Sep. 5, 2007

(65) Prior Publication Data

US 2009/0056158 A1 Mar. 5, 2009

(51) Int. Cl.
*G01B 5/25* (2006.01)
(52) U.S. Cl. .................................. 33/1 M; 74/490.08
(58) Field of Classification Search ............... 33/1 M; 74/490.08
See application file for complete search history.

(56) References Cited

U.S. PATENT DOCUMENTS

| | | | | |
|---|---|---|---|---|
| 3,495,519 A | * | 2/1970 | Bluitt et al. | 108/137 |
| 4,259,010 A | * | 3/1981 | Hauri | 356/2 |
| 4,575,942 A | * | 3/1986 | Moriyama | 33/1 M |
| 4,676,649 A | * | 6/1987 | Phillips | 356/401 |
| 4,995,277 A | * | 2/1991 | Yanagisawa | 74/490.09 |
| 5,031,547 A | * | 7/1991 | Hirose | 108/140 |
| 5,142,791 A | * | 9/1992 | Kobayashi et al. | 33/573 |
| 5,355,744 A | * | 10/1994 | Yanagisawa | 74/490.09 |
| 6,324,933 B1 | * | 12/2001 | Waskiewicz et al. | 74/490.01 |
| 6,327,929 B1 | * | 12/2001 | Yanagisawa | 74/490.09 |
| 2004/0244208 A1 | * | 12/2004 | Sawada et al. | 33/1 M |
| 2006/0064884 A1 | * | 3/2006 | Seo | 33/1 M |

FOREIGN PATENT DOCUMENTS

TW I242736 11/2005

* cited by examiner

*Primary Examiner*—Christopher W Fulton
(74) *Attorney, Agent, or Firm*—Banger Shia

(57) ABSTRACT

A positive load alignment mechanism comprises a platform device in which are disposed a plurality of driving devices, movable devices and movable bearing platforms. The driving device is connected to the movable device, and the movable bearing platform firmly supports a movable platform of the platform device. The driving devices are used to drive the movable devices to perform the back-and forth or left-and-right or rotating movement, and the movable bearing platforms firmly support the movable platform. By such arrangements, it can achieve the objectives of high pressure resistance, simplified structure, high security, high accuracy and all-direction displacement.

8 Claims, 5 Drawing Sheets

POSITIVE LOAD ALIGNMENT MECHANISM

BACKGROUND OF THE INVENTION

1. Field of the Invention

The present invention relates to a positive load alignment mechanism, and more particularly to a platform device which is disposed with driving devices which drive the movable platform to perform back and forth, left and right or rotating movement and movable bearing platforms which firmly support the movable platform. Thereby, the alignment mechanism can achieve the objectives of high pressure resistance, simplified structure, high security, high accuracy and all-direction displacement.

2. Description of the Prior Art

A conventional micron/nanometer positioning platform with six-degree of freedom disclosed in TW Pat. No. 093125237 comprises:

A base which includes two linear guideways on both sides; an X-axis saddle which can slide on the linear guideways of the base and each side of the X-axis saddle is disposed with a linear guideway; a Y-axis saddle which can slide on the linear guideways of the X-axis saddle; a first driving device which is installed vertically with respect to the linear guideways and located on one side of the abovementioned base; an X-axis spring return device which is installed between the abovementioned base and the X-axis saddle and located on the other side of the base; a first cuneiform slider mechanism which is installed between the first driving device and the X-axis saddle, and the first driving device, the first cuneiform slider mechanism and the X-axis spring return device work together to drive the X-axis saddle to move along the X axis; a second driving device which is vertically installed to the linear guideway of the X-axis saddle and located on one side of the X-axis saddle; a Z-axis spring return device which is installed between the X-axis saddle and the Y-axis saddle and located on the other side of the X-axis saddle; a second cuneiform slider mechanism which is installed between the second driving device and the Y-axis saddle, the second driving device, the second cuneiform slider mechanism and the Y-axis spring return device work together to drive the Y-axis saddle to move along the Z axis; a third driving device which is installed on the Y-axis saddle to drive a parallel-connected saddle to rotate around Y-axis, and a parallel-connected mechanism which is disposed on the parallel-connected saddle to control the tilt variation on the X-Y axis plane and a Y-axis displacement of a carrying platform.

Though the conventional micron/nanometer positioning platform with six-degree of freedom can realize six-freedom displacement, it still has the following disadvantages:

1. Complicated structure: the X-axis saddle, Y-axis saddle, X-axis spring return device, a first cuneiform slider mechanism, a first driving device, a second driving device, a Z-axis spring return device, a second cuneiform slider mechanism, a third driving device a parallel-connected saddle and a parallel-connected mechanism are positioned one upon the other on the base to form the positioning platform with six-degree of freedom, thus forming a complicated combination and configuration.

2. Poor security: as known from the abovementioned integral structure, with the complicated combination and configuration, the control of the tilt variation on the X-Z axis plane and a Y-axis displacement of a carrying platform will cause excessively strong moving force and rotating force or the separation which cause the impact on the user. So the poor security needs to be improved.

3. Time-consuming: as known from the abovementioned integral structure, a plurality of components is positioned one upon the other on the base to form the complicated positioning platform, so it must consume much assembly time during the manufacturing process.

4. Poor stability: as known from the abovementioned integral structure, a plurality of components is positioned one upon the other on the base to form the complicated positioning platform, so that the displacement of such a structure has poor accuracy and stability.

The present invention has arisen to mitigate and/or obviate the afore-described disadvantages.

SUMMARY OF THE INVENTION

In order to achieve the objectives of high pressure resistance, simplified structure, high security, high accuracy and all-direction displacement, a positive load alignment mechanism of the present invention has been developed.

The positive load alignment mechanism of the present invention is a platform device, and each of the three sides of the platform device is disposed with a driving device, a movable device and a movable bearing device. The driving device is connected to the movable device, and the movable bearing platform firmly supports the movable platform of the platform device. The driving devices are used to drive the movable devices to perform back and forth, left and right, or rotating movement, and the movable bearing platforms firmly support the movable platform, by such arrangements, it can achieve the abovementioned objectives.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
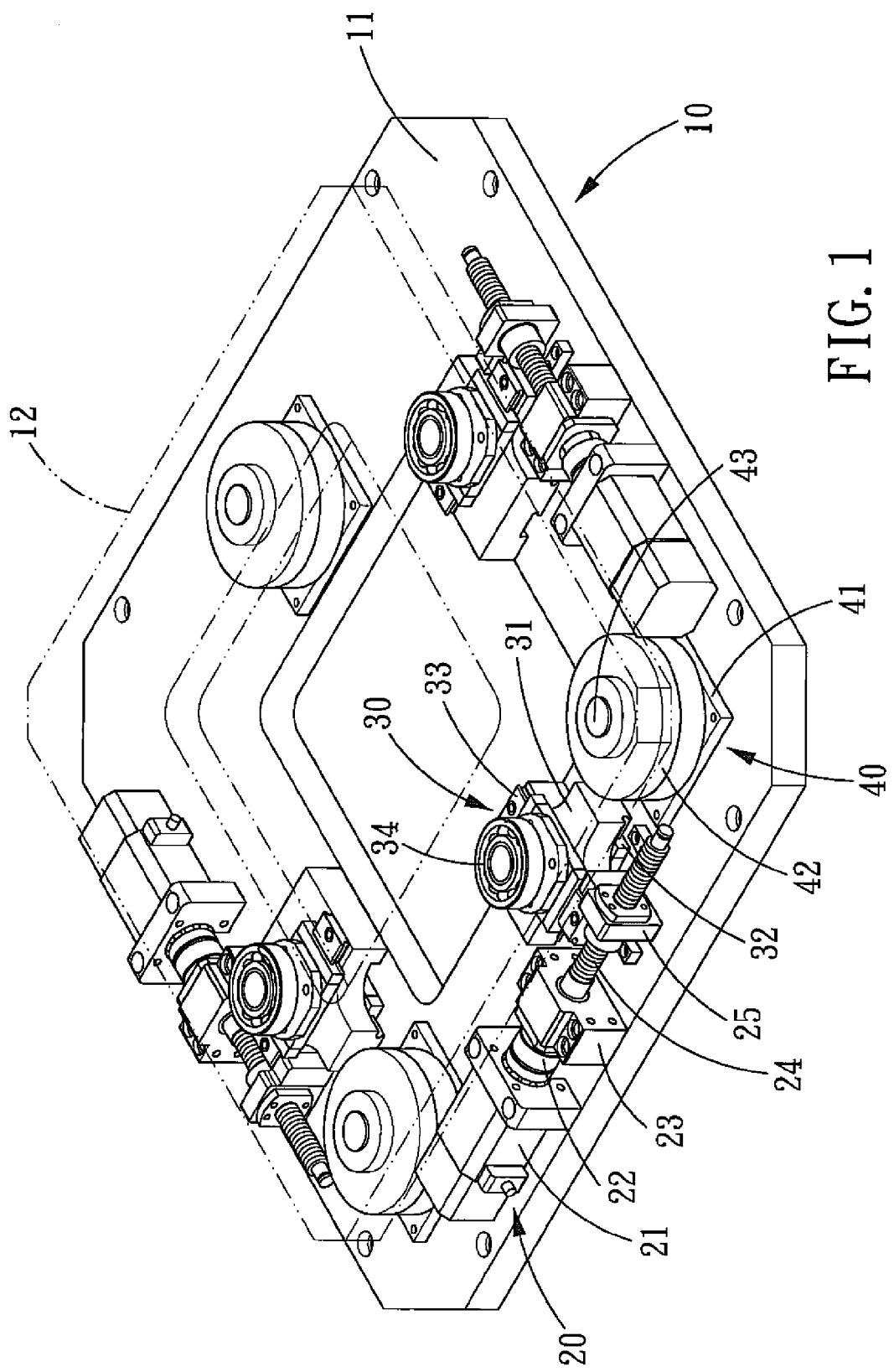
FIG. 1 is a perspective view of a positive load alignment mechanism in accordance with the present invention.
Figure 2:
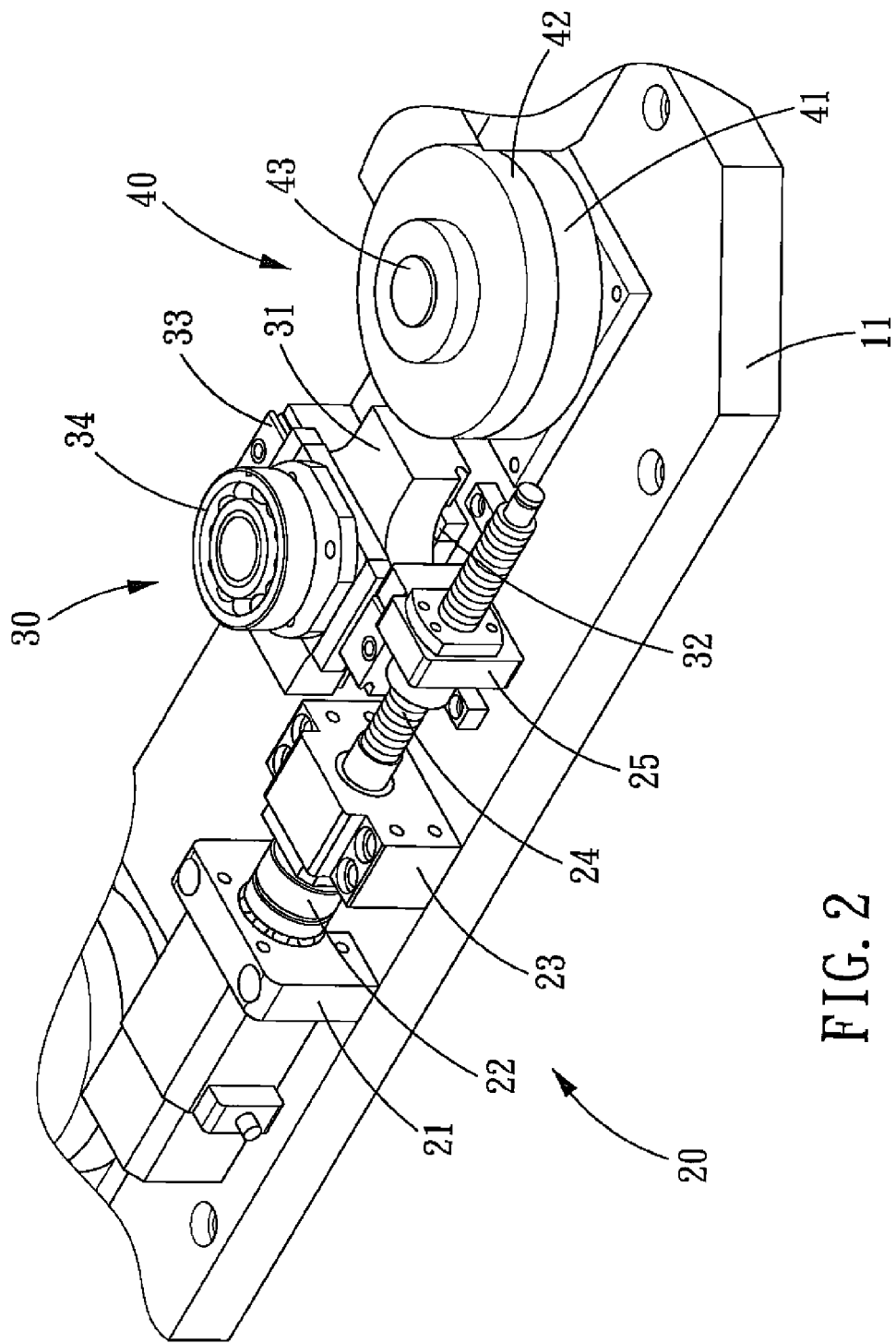
FIG. 2 is a perspective view of showing a part of the positive load alignment mechanism in accordance with the present invention.
Figure 3:
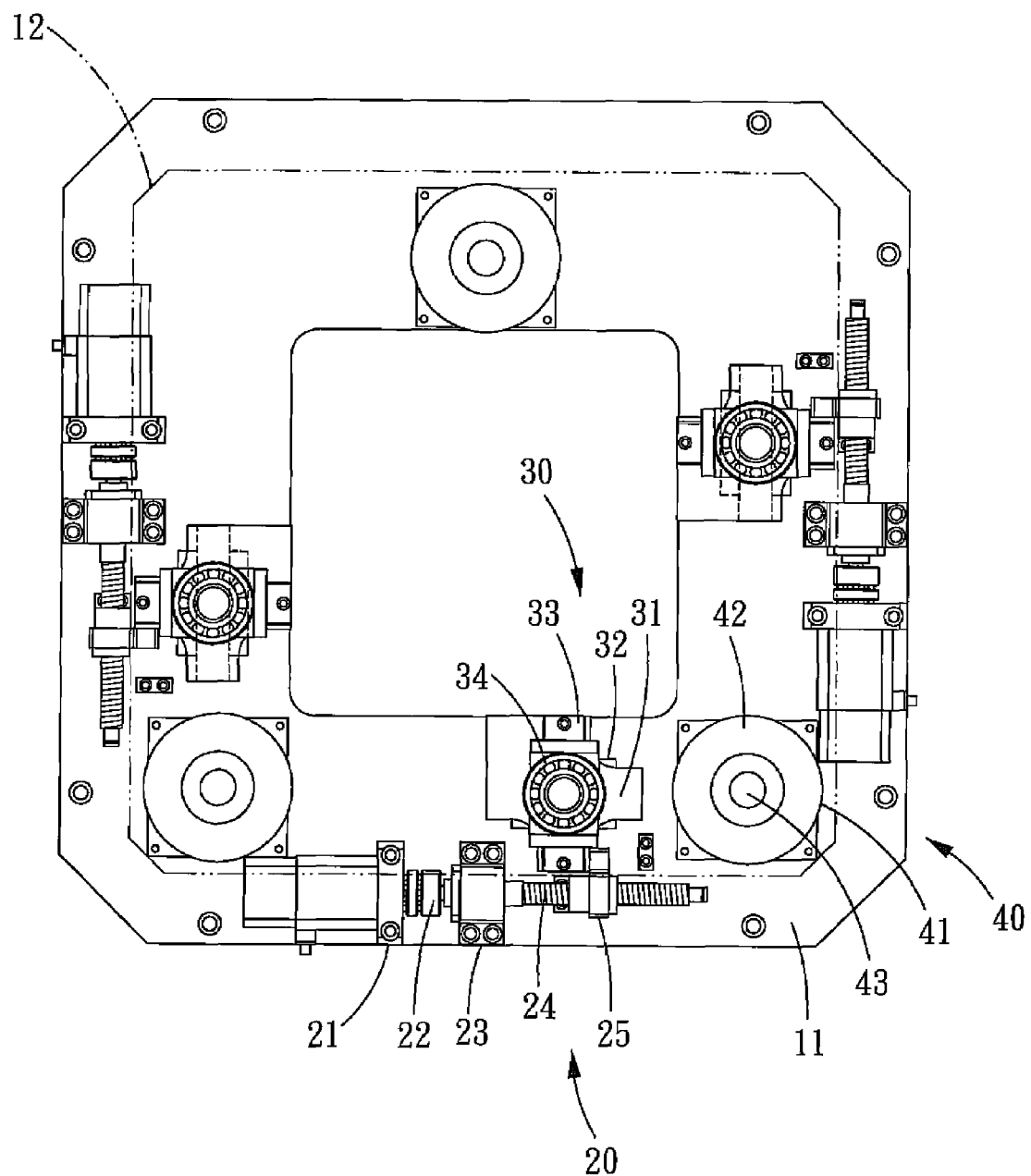
FIG. 3 is a top view of the positive load alignment mechanism in accordance with the present invention.

Referring to FIGS. 1-3, a positive load alignment mechanism in accordance with the preferred embodiment of the present invention comprises three driving devices 20, three movable devices 30 and at least three movable bearing platforms 40, that are disposed on a platform device 10. Each of the certain three sides of the platform device 10 is disposed with the driving device 20, the movable device 30 and the movable bearing platform 40. The driving device 20 is connected to the movable device 30. Additionally, the movable bearing platform 40 is firmly disposed in a movable platform 12 of the platform device 10, by using the driving devices to drive the movable devices to perform back and forth, left and right, or rotating movement, the alignment mechanism of the present invention can achieve the objectives of high pressure resistance, simplified structure, high security, high accuracy and all-direction displacement.

The platform device 10 includes a square hollow base 11 and a platform 12. On the base 11 are disposed the driving devices 20, the movable devices 30 and the movable bearing platforms 40, and the platform 12 opposite the base 11 is disposed on the movable devices 30 and the movable bearing platforms 40.

Each of the driving devices 20 includes a rectangular motor 21, a round plate-shaped linkage member 22, a square block fixing seat 23, a screw shaft 24 with a helical groove, and a small square connecting-member 25. The motor 21 is disposed on the base 11 and located adjacent to the outer edge thereof, and one end of the motor 21 is connected with the linkage member 22. One end of the linkage member 22 is disposed with the fixing seat 23. One end of the screw shaft 24 is inserted through the fixing seat 23 to connect with the linkage member 22. The other end of the screw shaft 24 is inserted through the connecting member 25, which is connected to the movable device 30.

The movable device 30 includes an L-shaped mating member 31, a first guideway unit 32, a second guideway unit 33 and a bearing member 34. The mating member 31 is connected with the connecting member 25 of the driving device 20. The first guideway unit 32 is disposed on one end of the mating member 31 adjacent to the base 11, and the second guideway unit 33 is disposed on the other end of the mating member 31. The first guideway unit 32 is parallel to the driving device 20, and the second guideway unit 33 is vertical to the first guideway unit 32. On the second guideway unit 33 adjacent to the platform 12 is disposed a bearing member 34, and the bearing member 34 is disposed on one end of the movable platform 12.

The movable bearing platform 40 includes a stabilizer 41 in the form of a square plate connected to a round plate, a round plate-shaped pressure resistance member 42 and a round protruding adjustment member 43, that are positioned one upon the other. The stabilizer 41 is disposed on one end of the base 11 adjacent to the motor 21 of the driving device 20. Moreover, in the stabilizer 41 is disposed more than two bearings, and the pressure resistance member 42 is disposed on the stabilizer 41 to cover the bearings. The adjustment member 43 is inserted through the stabilizer 41 and the pressure resistance member 42.

Figure 4:
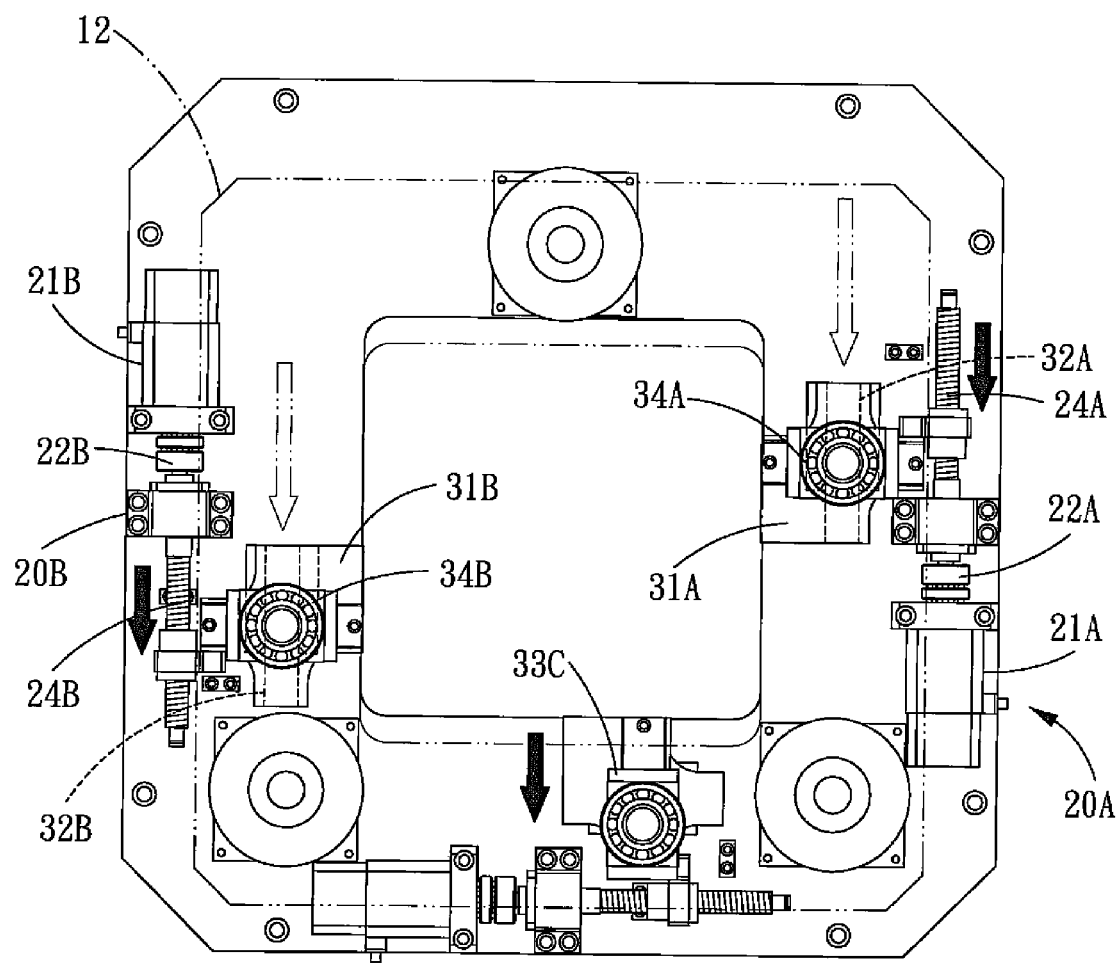
FIG. 4 is an operational view of the positive load alignment mechanism in accordance with the present invention.
Figure 5:
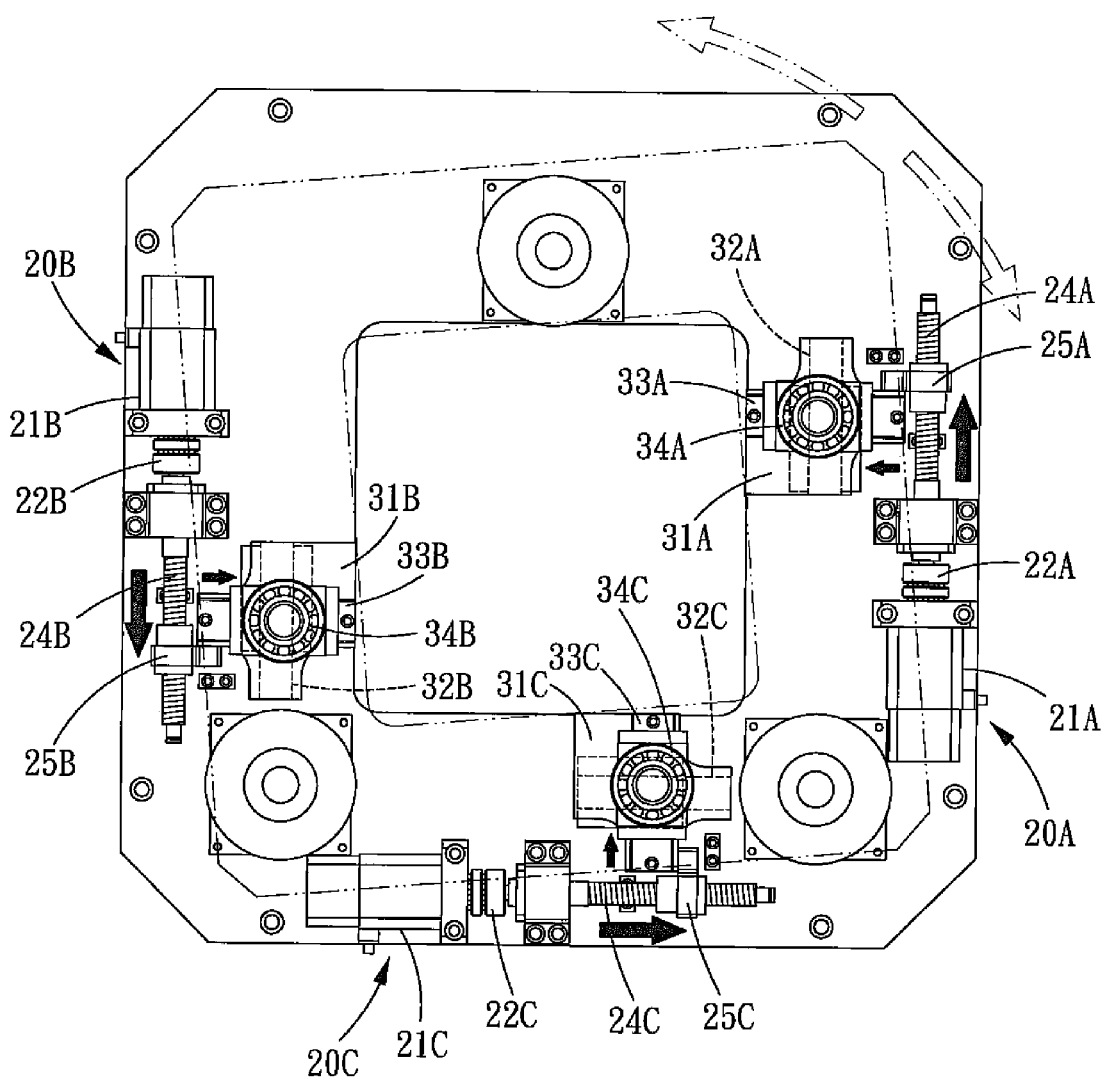
FIG. 5 is another operational view of the positive load alignment mechanism in accordance with the present invention.

Further referring to FIG. 4 which shows a back and forth or left and right movement of the platform device 10, the motors 21A, 21B of the two driving devices 20A, 20B on opposite ends of platform device 10 drive the linkage members 22A, 22B to make the screw shaft 24A, 24B rotate forwards or backwards. At the same time, the connecting members 25A, 25B will drive the mating members 31A, 31B to effect accurate back and forth displacement or positioning of the first guideway units 32A, 32B, so that the movable bearing members 34A, 34B connected to the movable platform 12 and the second guideway unit 33C are driven to effect accurate back and forth displacement or positioning of the movable platform synchronously. Further referring to FIG. 5, the motors 21A, 21B, 21C of the driving devices 20A, 20B, 20C of the movable platform device 10 drive the linkage members 22A, 22B, 22C to make the screw shafts 24A, 24B, 24C to rotate forwards or backwards, and then the connecting members 25A, 25B, 25C will drive the mating members 31A, 31B, 31C to effect accurate offset rotation or positioning of the first guideway units 32A, 32B, 32C and the second guideway units 33A, 33B, 33C, thus synchronously effecting accurate offset rotation or positioning of the movable platform 12 by driving the bearing members 34A, 34B, 34C connected to the movable platform 12 to rotate.

The positive load alignment mechanism in accordance with the preferred embodiment of the present invention has the following advantages:

1. Simplified structure: the platform device 10 includes a base 11 and a movable platform 12, on the base 11 are disposed the driving devices 20, the movable device 30 and the movable bearing platforms 40, the movable platform 12 opposite the base 11 is disposed on the movable devices 30 and the movable bearing platforms 40, so the present invention is a single double-layer structure, thus simplifying the structure.

2. High security: since the driving devices 20, the movable device 30 and the movable bearing platforms 40 are disposed on the base, and the movable platform 12 is disposed with the movable devices 30 and the movable bearing platforms 40, such a double-layer combination can achieve the objectives of high stability and security;

3. High pressure resistance: on the three sides of the platform device 10 are disposed the movable bearing platforms 40, and in the stabilizer 41 are disposed more than two bearings, and the pressure resistance member 42 is disposed on the stabilizer 41 to cover the bearings, thus achieving the high pressure resistance and stability;

4. High accuracy and all-direction displacement: since the driving devices 20, the movable device 30 and the movable bearing platforms 40 are disposed on the movable platform 12 and the abovementioned base 11; such a double-layer combination can realize the high accuracy and all-direction displacement (X, Y, Z).

5. High stress-bearing performance: the movable bearing platform 40 is able to bear the tension stress and the compression stress that are applied to the platform device 10, so as to achieve the objective of improving the stress-bearing performance.

While we have shown and described various embodiments in accordance with the present invention, it is clear to those skilled in the art that further embodiments may be made without departing from the scope of the present invention.

What is claimed is:

1. A positive load alignment mechanism comprising:

a platform device including a base and a movable platform;

three driving devices being disposed on three sides of the base, each driving device including a motor, a screw shaft and a connecting member, one end of the screw shaft being connected to the motor, and the other end of the screw shaft being inserted through the connecting member;

three movable devices being disposed on the base and connected to the driving devices, each movable device including a mating member, a first guideway unit, a second guideway unit and a bearing member, the mating member being connected to the connecting member of the driving device, the first guideway unit being disposed on one end of the mating member adjacent to the base, the second guideway unit being disposed on the other end of the mating member, the first guideway unit being parallel to the driving device, the second guideway unit being vertical to the first guideway unit, the bearing member being disposed on the second guideway unit adjacent to the movable platform and disposed on one end of the movable platform; and three movable bearing platforms being disposed on the base adjacent to the driving devices, one end of each movable bearing platform supports the movable platform, and the movable bearing platforms being able to bear tension stress and compression stress that are applied to the platform device.

2. The positive load alignment mechanism as claimed in claim 1, wherein the driving devices, the movable devices and the movable bearing platforms are disposed on the base, and the movable platform opposite the base is disposed on and driven by the movable devices and the movable bearing platforms.

3. The positive load alignment mechanism as claimed in claim 1, wherein each movable bearing platform includes a stabilizer, a pressure resistance member and an adjustment member, one end of the stabilizer is disposed on the base adjacent to the motor of the driving device and the pressure resistance member is disposed on the other end of the stabilizer, the adjustment member is inserted through the pressure resistance member and the stabilizer, and one end of the adjustment member supports the movable platform.

4. The positive load alignment mechanism as claimed in claim 1, wherein each driving device further includes a linkage member, and a fixing seat, the motor is disposed on the base and located adjacent to an outer edge thereof, and one end of the motor is connected with the linkage member, one end of the linkage member is disposed with the fixing seat, one end of the screw shaft is inserted through the fixing seat to connect with the linkage member, and the other end of the screw shaft is inserted through the connecting member which is connected to the movable device.

5. A positive load alignment mechanism comprising:
a platform device including a base and a movable platform;
at least two driving devices being disposed on opposite sides of the base, each driving device including a motor, a screw shaft and a connecting member, one end of the screw shaft being connected to the motor, and the other end of the screw shaft being inserted through the connecting member;
at least two movable devices being connected to the driving devices, each movable device including a mating member, a first guideway unit, a second guideway unit and a bearing member, the mating member being connected to the connecting member of the driving device, the first guideway unit being disposed on one end of the mating member adjacent to the base, the second guideway unit being disposed on the other end of the mating member, the first guideway unit being parallel to the driving device, the second guideway unit being vertical to the first guideway unit, the bearing member being disposed on the second guideway unit adjacent to the movable platform and disposed on one end of the movable platform; and
at least three movable bearing platforms being disposed at four sides of the base.

6. The positive load alignment mechanism as claimed in claim 5, wherein the driving devices, the movable devices and the movable bearing platforms are disposed on the base, and the movable platform opposite the base is disposed on and driven by the movable devices and the movable bearing platforms.

7. The positive load alignment mechanism as claimed in claim 5, wherein each driving device further includes a linkage member, and a fixing seat, the motor is disposed on the base and located adjacent to an outer edge thereof, and one end of the motor is connected to the linkage member, one end of the linkage member is disposed with the fixing seat, one end of the screw shaft is inserted through the fixing seat to connect with the linkage member, and the other end of the screw shaft is inserted through the connecting member which is connected to the movable device.

8. The positive load alignment mechanism as claimed in claim 5, wherein each movable bearing platform includes a stabilizer, a pressure resistance member and an adjustment member, in the stabilizer are disposed more than two bearings, and one end of the stabilizer is disposed on the base, and the pressure resistance member is disposed on the other end of the stabilizer, the adjustment member is inserted through the stabilizer and the pressure resistance member, and one end of the adjustment member supports the movable platform.

* * * * *